June 14, 1966 A. R. DAVIS 3,256,463
SILICON CONTROLLED RECTIFIER CONTROL SYSTEMS
Filed March 15, 1961 7 Sheets-Sheet 1

INVENTOR.
ARIEL R. DAVIS
BY
Frank C. Bower
his ATTORNEY

June 14, 1966　　　A. R. DAVIS　　　3,256,463
SILICON CONTROLLED RECTIFIER CONTROL SYSTEMS
Filed March 15, 1961　　　　　　　　7 Sheets-Sheet 4

INVENTOR.
ARIEL R. DAVIS
BY
Frank C. Brown
his ATTORNEY

June 14, 1966  A. R. DAVIS  3,256,463
SILICON CONTROLLED RECTIFIER CONTROL SYSTEMS
Filed March 15, 1961  7 Sheets-Sheet 5

INVENTOR.
ARIEL R. DAVIS
BY
his ATTORNEY

INVENTOR.
ARIEL R. DAVIS
BY
his ATTORNEY

United States Patent Office 3,256,463
Patented June 14, 1966

3,256,463
SILICON CONTROLLED RECTIFIER
CONTROL SYSTEMS
Ariel R. Davis, Salt Lake City, Utah, assignor to B. J. Management Corporation, Salt Lake City, Utah, a corporation of Utah
Filed Mar. 15, 1961, Ser. No. 95,952
25 Claims. (Cl. 315—158)

This invention relates to control systems utilizing solid state controlled devices such as silicon controlled rectifiers as the main current carrying means, and is directed particularly to the retarding of the rate of increase of current through conducting silicon controlled rectifiers and to the triggering circuit for rendering the rectifiers conductive and for controlling the amount of current passed.

Silicon controlled rectifiers have some desirable qualities and some undesirable qualities. In overcoming some of the undesirable qualities the advantages of the desirable qualities are often offset. One of the primary qualities is the small size of the rectifier for the amount of current passed by the rectifier. One of the undesirable characteristics is the inability of the rectifiers to withstand, even for a half cycle, excessive surge currents that may normally occur with cold lamp loads. Another undesirable characteristic is the vibration of lamp filaments and radio frequency interference due to the sharp rise of current on conduction of the rectifier.

However, to ensure proper operation of a device using silicon controlled rectifiers and to realize its advantages the rectifiers must be operated at or below the rated temperature, current and voltage values and not exceed the permissible temperature, current and voltage values permitted for short periods of time. In the supply of current to incandescent lamps having tungsten filaments high in-rush currents are encountered on connection to cold filaments. These currents may be up to twenty-five times the normal rated incandescent lamp current. The time delay constant for in-rush currents may be from five to forty cycles of a sixty cycle current. The silicon controlled rectifiers have a peak rating of five times the rated current for one-quarter of one cycle and three times its rated current for a limited number of cycles.

Another problem encountered in supplying incandescent lamps from silicon controlled rectifiers is the very steep wave front formed by the quick turn on time of the rectifiers when less than the full current is passed on dimming of the lamps. This causes the lamp filaments to resonate with a loud audible noise. This steep wave front also radiates and induces a radio frequency noise into the electronic transmission which interferes with sound systems that may be operated near the dimming system.

Most control circuits are very non-linear in the movement of the control handle in reference to the amount of light emitted by the controlled lamps thereby locating the control in a small portion of travel of the control handle. This is due to the fact that most control circuits are non-linear and when used with a linear potentiometer the output will be non-linear.

In modern dimming systems the dimmers should be capable of being ganged in various combinations to vary the dimmers from one set of values to another set of values on demand. Some dimmers increase the light output while other dimmers decrease the light output of the controlled lamps. Also modern stage practices call for a means of combining various stage circuits together for control by a single dimming unit. In such systems cold lamp loads are often hot patched into illuminated lamps or a cold lamp can be plugged into a circuit that is operating. Means must be provided to protect the silicon controlled rectifiers against overload currents in excess of the permissible values. The phase shifting firing means should be small and have a size commensurate with the size of silicon controlled rectifiers.

A further feature of a control system utilizing silicon controlled rectifiers is the adaptation of the system with a programming means for sequentially adjusting the con- while other dimmers decrease th elight output of the con- Such a programming means should be small in size so that an overall programming and control system may be provided in keeping with the minuteness, simplicity and dependability of the basic solid state control systems.

An object of the invention is to provide a small size, light weight current control means that limits surge currents.

Another object of this invention is to provide a small size, light weight, current delay means that limits during each half cycle the surge current of the rectifier to less than the destructive value.

Another object of this invention is to provide a small size, light weight means to reduce the rate of increase of the surge current.

Another object of the invention is to provide a small size, light weight current modifying means that is inexpensive and easy to manufacture.

Another object of the invention is to provide solid state type dimmers for incandescent lamps that do not produce fialment noise.

Another object of the invention is to provide a small size, renewable short circuit current limiters.

Another object of the invention is to provide a control system utilizing silicon controlled rectifiers and having a triggering or firing circuit that is comparable in size to the silicon controlled rectifiers.

Another object of the invention is to provide a triggering circuit for a silicon controlled rectifier that is readily adaptable to a simplified programming system.

Another object of the invention is to provide a programming system having a minimum of moving parts and a memory storage unit providing a selection over a continuous range of lamp settings.

Other and further objects and advantages wil be apparent from the following description taken in connection with the drawings.

FIGS. 6a and b are perspective views of an assembled control system.

FIG. 16 is a perspective and fragmentary sectional view of the current limiting fuse.

Figure 1:
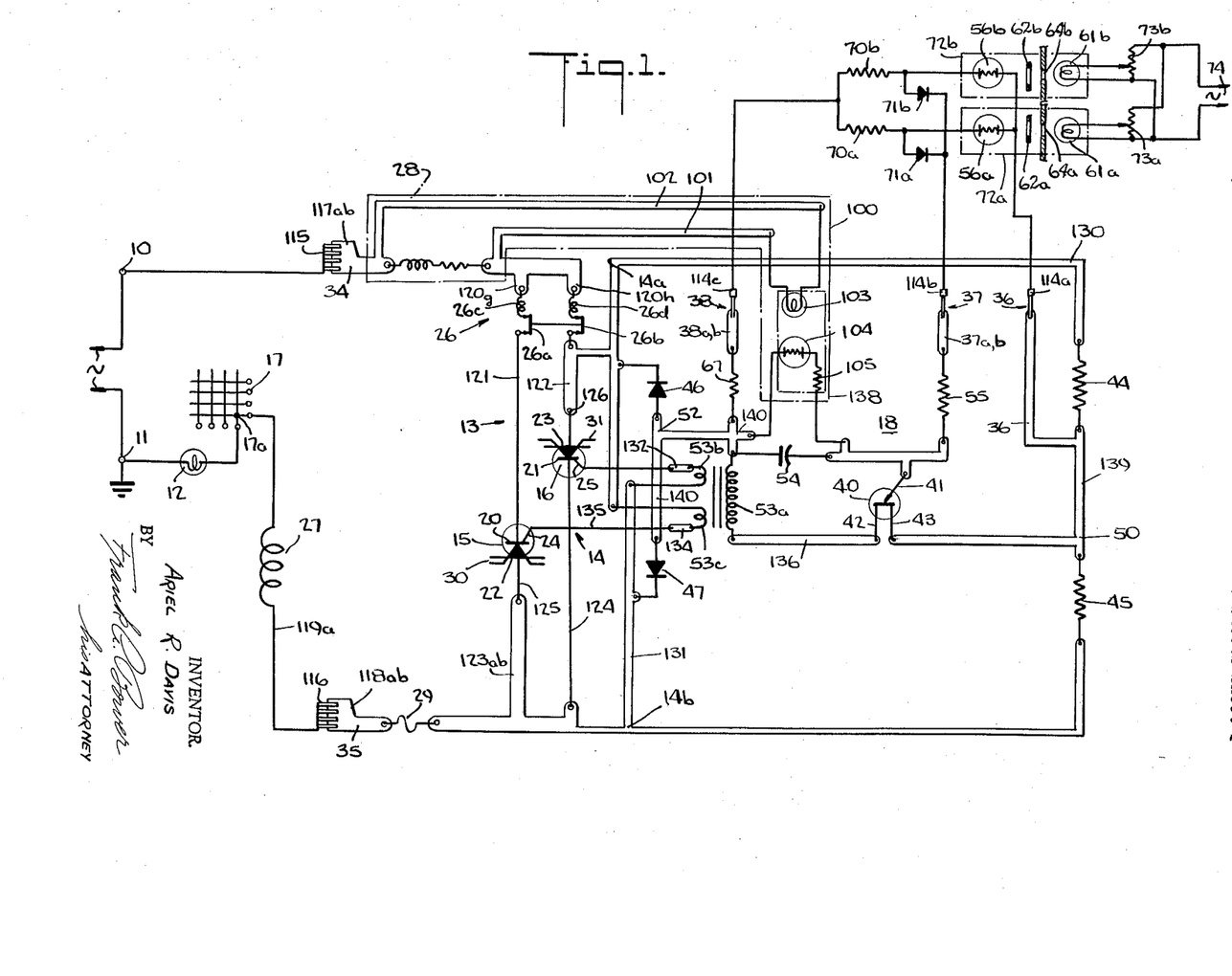
FIG. 1 is a diagrammatic view of the control system.
Figure 1B:
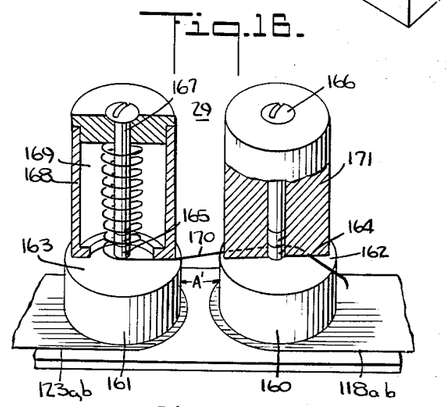

Referring to FIG. 1 the preferred embodiment of the control system is diagrammatically illustrated. For the purpose of describing the operation of the components of the control system, an alternating current source is connected across the input terminals 10, 11 to supply current to a load 12 through the patch panel 17 and the control system including the air core choke 27. The load, for the purpose of describing the invention, comprises incandescent filament type lamps. The main load current carrying components are the silicon controlled rectifiers 15, 16, air code choke 27, circuit breaker 26, current limiting fuse 29 and incandescent lamps 12, and are connected by the heavy lines or strips. The rectifiers 15, 16 are connected in parallel legs to alternately pass the current. The period of conductivity of the rectifiers is controlled by the trigger circuit 18 indicated by the light lines or strips of FIG. 1. The trigger circuit is connected across the terminals 14a, 14b. The ouput of the trigger circuit is connected to the silicon controlled rectifiers 15, 16 and renders the rectifiers conductive.

The silicon controlled rectifiers are of a conventional PNPN type with cathodes 20, 21 anodes 22, 23 and gate electrodes 24, 25. In series with the silicon controlled rectifiers is air core choke 27. The legs 13, 14 have silicon controlled rectifiers 15, 16 respectively and connected in a respective leg in a back to back relation. In this relation when current passes through one of the rectifiers the other blocks the passage of current. The air core choke 27 is connected in series with the rectifiers 15, 16 and modifies the electrical characteristics of the circuit. The functioning and control of the silicon controlled rectifiers are well known and will not be discussed in great detail. The rectifiers are made in various current ratings such as 5, 10, 15, 25 and 100 amperes. The rectifiers rated at 3000 watts normally carry 30 peak amperes. The maximum permissible peak amperes that the rectifiers pass is approximately 150 peak amperes for one half cycle. Currents in excess of this maximum will cause the rectifier to instantly fuse. This is a shorter time than the response time of normal fuses and relays. The extremely fast acting current limiting means or I²T fuse 29 is provided for overcurrent conditions and in case the other protective devices do not function. Most relay and protective devices operate over a duration of several cycles so that if high currents are encountered due to shorting or otherwise the silicon controlled rectifiers are destroyed. The air core choke has a constant impedance and limits the load current to safe values by preventing the current from exceeding the maximum permissible value within any half cycle. The rectifiers are provided with heat sinks 30, 31 which are in this embodiment circular copper plates having approximately 36 square inches of area. This substantially increases the overall size of the rectifiers. The space occupied is, however, substantially less than comparable control devices of the same wattage.

The trigger circuit controls the length of the period that the silicon controlled rectifiers are conductive and thus the total amount of current passed on each half cycle. The components of the trigger circuit are small.

The circuit components comprise resistors connected in series across the terminals 14a, 14b. Also connected in series between the terminals are rectifiers 46, 47 in back to back relation and forming a full wave bridge network. These rectifiers are of the uncontrolled type which blocks passage of current in one direction and passes current in the opposite direction on application of voltage to main electrodes. The primary winding 53a, unijunction transistor 40, resistor 55, photocell 56 form a network extending across the direct current diagonal between terminal junctures 52 and 50. The terminal juncture 52 is between the rectifiers 46, 47 and is formed by the conducting strip 140. The terminal juncture 50 is between the resistors 44, 45 and is formed by the conducting strip 139.

The unijunction transistor 40 has bases 42 and 43 and an emitter 41. The base 43 is connected to terminal juncture 50 between resistors 44, 45 and base 42 is connected to winding 53a of the gate transformer 53. The winding 53a is connected to the terminal juncture 52 to form one path across the diagonal. The unijunction 40 blocks the flow of current. The condenser 54, resistor 55 and photocell or light sensitive means 56a are connected zetween junctures 52 and 50. The condenser 54 is also connected across the winding 53a and emitter 41 and is charged by the flow of current through the photocell 56a. When the voltage across the condenser 54 is equal to the firing voltage of the unijunction transistor 40, the transistor 40 conducts forming a current path through the discharge loop formed by condenser 54, primary winding 53a, base 42, emitter 41 to the condenser 54. The discharge current produces a pulse of current which is transmitted to the secondary windings 53b, c. One of these pulses fires one of the silicon controlled rectifiers depending on the polarity of the rectifier. Thus for each half cycle a pulse is produced in synchronized phase relation with the supply voltage. The rectifiers 46, 47 cause the current to flow through the charging circuit in the same direction for each half cycle so that the condenser 54 is charged with the polarity in the same relation to the unijunction transistor. The secondary windings are connected to the gate electrode and cathode of a respective silicon controlled rectifier so that the pulse conforms to the polarity of the electrodes and causes one of the rectifiers to conduct on the application of the pulse depending on the polarity of the supply current.

At the end of each half cycle the unijunction also discharge the condenser so that a new charge is started with each half cycle so that the firing or triggering pulses are synchronized with each half cycle and a definite time interval or phase relationship can be determined by the circuit components. The voltage and current supplied from the input terminals 10, 11 and applied to the load 12 is controlled by delaying the point in the cycle in which the rectifiers are switched from the blocking to a conducting state. The trigger circuit draws on the voltage developed across the silicon controlled rectifier during the blocking state for the operation of the trigger supply voltage and synchronization of the triggering circuit. The triggering circuit is connected to the output of a voltage dividing network consisting of two resistors 44, 45 and two diode rectifiers 46, 47 connected anode to anode to form a full wave rectified voltage. The line voltage dividing resistors 44, 45 have a value to form a voltage across the unijunction base electrodes not inexcess of 40 volts. The resistance across the base electrodes is between 5,000 to 10,000 ohms and the resistance of the resistors 44, 45 is each 10,000 ohms. The primary winding 53a has a resistance of 50 ohms. The diodes have a low conduction resistance. The voltage appearing across the base electrodes 42, 43 is a direct ratio of the voltage dividing network. The supply voltage is divided between either resistor 44 or 45 and the winding 53a and electrodes 42, 43. On one half cycle the resistor 44 is in series with unijunction base electrodes, the winding 53a and the diode 47. The resistor 45 is in parallel with the bases 42, 43, the winding 53a and diode 47 forming a parallel network in series with the resistor 44. The resistor 44 is 10,000 ohms. The ohmic value of the unijunction bases is between 5,000 and 10,000 ohms. Assuming the higher value the parallel network has a resistance of approximately 5,000 ohms. The r.m.s. value of a half cycle is approximately 70 volts. This is divided between resistor 44 and the parallel network. The maximum voltage appearing across the bases of the unijunction is approximately 25 volts.

This network voltage charges the condenser through photoresistor 56a or 56b, resistor 55 to fire the unijunction transistor and the silicon controlled rectifier that has a positive anode voltage during that half cycle. The non-linear characteristics of the circuit are compensated by the variation of the photoresistor which permits the establishment of a linear variation in illumination in relation to the position of the light control strip.

Upon firing, the voltage across the silicon controlled rectifiers decreases to a conduction value of approximately one volt. This keeps the capacitor discharged until reversal of the supply voltage at which time a new timing cycle starts for the alternate rectifier. The firing angle of both silicon controlled rectifiers is controlled by the light impinging on the photoresistor. When there is no light the voltage across the condenser cannot reach the peak emitter voltage of the unijunction before the line voltage reverses. During this reversal the interbase voltages dip to zero and the unijunction 40 fires and discharges the condenser in preparation for the next half cycle.

In order to prevent the load current from rising too rapidly a line impedance 27 is provided. The impedance also limits the peak current to below the quarter cycle rating of the silicon controlled rectifiers. The rate of rise time has a value that on normal currents it is rapid and on surge currents it is long.

The choke 27, connected in series with the rectifiers, is formed with an outer diameter of eight inches and a center opening 33 having a diameter of three inches and with a thickness of approximately one and one-half inches. The choke limits the current through the rectifiers to below the maximum permissible value and in addition reduces the rate of increase of the current on the firing of the rectifier to eliminate the filament and radio frequency noise due to the time constant of the choke.

The choke is formed from thin ribbon of anodized aluminum. The anodizing forms a coating of aluminum oxide on the surfaces of the ribbon. This coating acts as an insulating layer preventing transference of current between the turns. Thus the ribbon is coiled without an additional insulating element. The choke has a constant impedance because of the air magnetic path for the flux of the current passing therethrough. Since the flux of the current is in a nonmagnetizable medium such as air the choke does not saturate on short circuit or overload current. All of the magnetic energy is returned to the circuit without loss due to the air path. The choke further eliminates radio frequency and filament noise by eliminating the sharp rise in current. It also prevents any interaction between firing circuits.

The important characteristic of this choke is the time of response. This is calculated from the formula $T=L/R$ where L is the inductance of the choke and R is the resistance of the choke. T is the period of time for the current to reach two-thirds of the maximum current through the coil. On 60 cycle the one-quarter conduction cycle the time is approximately .0041 second. The resistance of the coil is .12 ohm and the inductance is .0026 henry. By utilizing a ribbon having a thickness of .015 inch and a width of approximately one and one-half inches a choke of the proper inductance may be formed. The choke will have approximately 140 turns.

The inductive reactance of the coil may be calculated from the formula $X_L=2\pi fL$. With $f=60$ cycles per second and $L=.0026$ henry the inductive reactance is approximately one ohm. The constant impedance of one ohm makes it possible to connect the circuit to a dead short circuit and keep the peak current less than 120 amperes. This permits hot patching of the dimmer.

The choke passes the current to a respective silicon controlled rectifier. The coil and rectifiers form a functional combination which may be considered as a single electrical component for passing the load current.

This combination of choke and silicon controlled rectifiers is a current control unit that has a high wattage capacity for its physical size and is capable of withstanding repeated excessive and short circuit currents without damage to the unit. Although the unit is described in connection with a dimmer for stage lights, it is readily adaptable to controlling currents for other purposes.

The incandescent lamps 12 are of the tungsten type. The tungsten filament type lamps have very low resistance when the filaments are cold. When a full supply voltage is applied to the lamps a very high surge current is developed. This surge or in-rush current may be twenty-five times higher than the normal rated current passed by the lamps when incandescent and twenty-five times higher than the rated current of the silicon controlled rectifiers. Depending upon the size of tungsten lamp used the filaments may require from 10 to 40 cycles of the alternating current in order to reach normal operating conditions and thus pass the normal rated current. The conventional PNPN type of silicon controlled rectifiers has a surge rating considerably less than tungsten lamps. The surge rating of silicon controlled rectifiers is three times the normal rated current for a limited number of cycles and five times the normal rated current for half a cycle. Thus for a silicon controlled rectifier rated at 3000 watts the normal rated peak current is 30 amperes. The surge rating for one cycle would then be 150 amperes and for a limited number of cycles the surge rating is 75 amperes.

In addition to the surge or in-rush currents caused by hot patching of cold filaments the rectifiers are subject to surge currents produced by short circuits. These short circuits are quite likely to be sustained as distinguished from the decreasing of current on the heating of the filaments. The control system distinguishes between these two conditions. On hot patching or connecting of cold filaments, with the control system at full bright, the control system does not cease operating but maintains a current to warm the lamp filaments. On short circuit the control system is disconnected from the main lines.

The protective components must differentiate between the in-rush currents warming the lamps and sustained short circuits requiring the opening of the circuit.

The air core choke provides a constant impedance and reduces the rate of rise of current and limits the maximum current to less than the maximum current safely passed by the rectifiers for several cycles.

The circuit breaker 26 is of a conventional type with two contact bars 26a, 26b and two sensing coils 26c, 26d. The contact bar 26a completes the circuit through leg 13 and contact bar 26b completes the circuit through leg 14. The current sensitive coils 26c and 26d are coupled to legs 13 and 14 respectively to sense an overload in a respective leg. An overload current in either leg will actuate the breaker and open bars 26a, 26b. The circuit breaker operates in a conventional manner and in this apparatus is set to operate in about forty cycles of a current of 60–70 amperes. The silicon controlled rectifiers of three thousand watts capacity can withstand such excess currents for the period of forty cycles.

Most circuit breakers have an instant current tripping rating of ten times the normal current rating of the breaker. If a single pole breaker holds on a sustained load of 30 amperes, the breaker is designed to instantly trip on passage of a peak current of 300 amperes. If a two pole breaker rated at 15 amperes with current sensitive elements in series with each rectifier is used, the sensitive elements on normal current sense only each half cycle of 15 amperes each but measure it as 30 ampere current. However, on 150 ampere overload each sensing element senses the half cycle of the peak current as 150 amperes and instantly trips. Therefore, the breaker has an instant tripping ratio of 1 to 5 instead of 1 to 10 giving faster protection to the silicon controlled rectifier.

The current limiting fuse 29 is connected between the terminal 35 and legs 13 and 14 to pass the current of either leg. The fuse is illustrated in detail in FIG. 16 and will be described in detail later herein. The fuse 29 is not a conventional fuse but is of the rapid type responding to the excessive currents in an I²T relation. The primary purpose of the fuse is to prevent damage to the rectifier if the other elements are not operative or the shorting fault should occur between the protective component and the rectifiers. For example, the filament in the lamp of the trigger retarder may burn out so that the current continues to peak at 120 amperes for several cycles. The breaker may malfunction requiring the fuse to function at the end of a given period. Thus if the breaker should fail to function after a period of 40 cycles, the heat accumulation after 40 cycles should be sufficient to open the fuse. The air core choke, trigger retarder and the breaker protect the rectifiers against all surges occurring from conditions external to the control system except for the application of an overvoltage to the input terminals.

Figure 18:
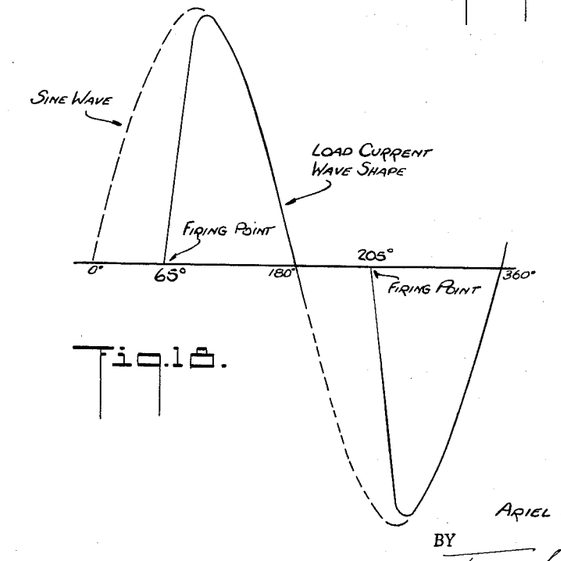
FIG. 18 illustrates the current through the silicon controlled rectifiers on a sustained short circuit.

The trigger retarder 100 comprises impedance 28, a lamp 103, a photoresistor 104 and a resistor 105. The impedance 28 may be a resistor or preferably a small air core inductive resistor. The lamp 103 is connected across the impedance 28 by leads 101, 102 and under normal operating conditions is not illuminated. On the occurrence of a surge current impedance 28 develops enough voltage to illuminate the lamp 103 to reduce the resistance of the photoresistor 104 to a value that would retard the firing of the gate pulse to zero or a low value. The resistor 105 is connected in series with the photocell 104 to limit the rate of discharge of the condenser so that the gating pulse will only be partially delayed permitting a partial conduction of the rectifiers. A predetermined limited current in excess of the rated current but less than the permissible overload current will be passed by the rectifiers. This occurs on each half cycle until the overload is eliminated. In FIG. 18 the current values for each half cycle are illustrated in comparison to the peak value of full load current passed by filaments warming up. The load impedance 27 also limits the rise of the delayed current by virtue of its time constant. Thus the rate of rise of the current is reduced and the current is less than it would be if the choke were not present.

Thus the choke and trigger retarder cooperate to provide a modified surge current to pass on successive half cycles until the breaker opens or the load lamp filaments 12 increase in resistance to limit the current to its normal values.

The function of these two components is to regulate the surge currents so as to actuate the circuit breaker in the case of a dead short and not to actuate the circuit breaker on application of full power to cold filament or to hot patching of a cold filament. In the case of a stiff control system and a large amperage the current reaches a peak of 80 amperes in the first quarter of the cycle due to the time constant of the air choke. This peak current would reach 120 amperes on the next half cycle except for the operation of the trigger retarder which reduces the angle of firing of the control rectifiers. The current is much less than the maximum rating of the control rectifiers and greater than a normal current so that the circuit breaker will function on a dead short. The circuit breakers usually function within forty cycles and incandescent filaments warm up within 10 to 40 cycles. In the case of cold filaments, as the filaments warm up the current will decrease to a normal value and the trigger retarder will cease to function.

If 3,000 watt lamp load with cold tungsten filaments were connected to the silicon controlled rectifier control unit without the line impedance choke or retarder circuit, the current would have peak values of 400 to 600 amperes on the first half cycle. Such a current would instantaneously fuse silicon controlled rectifiers having a 3,000 watt normal hot filament capacity.

After the firing of the silicon controlled rectifiers the trigger circuit cannot limit the current for that particular one half cycle. Any limitation on the current through the rectifiers will depend upon the electrical elements in series with the rectifiers. In the operation of the rectifiers the parameters of these electrical elements are predetermined at the time of firing so that the current passing through the rectifiers will not exceed prescribed values. Thus the rectifiers are protected against excessive currents. However, there are occasions that the parameters will change after the rectifiers become conductive so that excessive currents will pass through the rectifiers or it is necessary for practical operation of the unit to render the rectifiers conductive even though the parameters of electrical elements will cause excessive currents. The foregoing control system can provide current to electrical elements having parameters which would cause excessive currents and still protect the rectifiers against damage. The combination of the air core choke and the trigger retarder limits the load current to permissible values irrespective of the parameters of the electrical elements to which the unit is connected.

Figure 4:
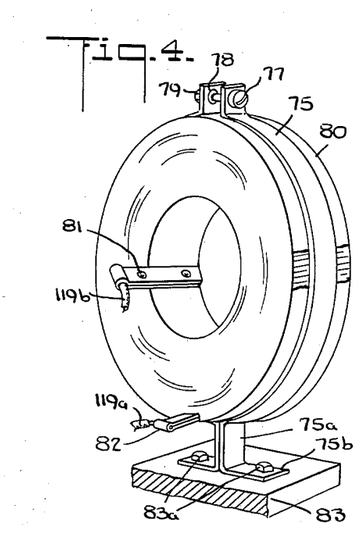
FIG. 4 is a perspective view of the air core choke and mounting.
Figure 6:
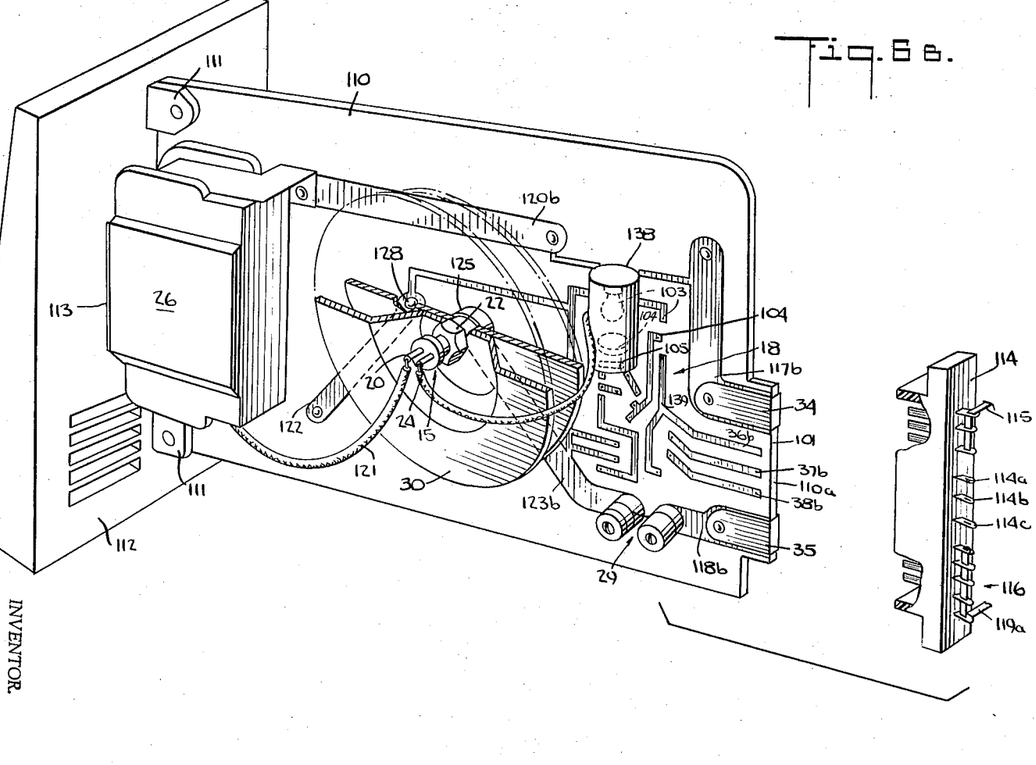

The specific embodiment of the dimmer is illustrated in FIGS. 4 and 6a and 6b. In FIGS. 6a and 6b the component includes the circuit breaker 26, the silicon controlled rectifiers 15 and 16, the fuse 29, the trigger circuit 18 and the trigger retarder 100. These elements are mounted on a panel 110 which is secured by fastening means 111 to a front panel 112. The mounting panel 110 has the interconnecting conductive elements formed thereon as a printed circuit on each side of the panel. The circuit breaker 26 is mounted on the forward end of the panel to extend through the opening 113 in the panel 112 so that the unit may be turned on by closing the circuit breaker from the outer side of the front panel 112. The load current passes to the panel 110 through the receptacle 114 having terminals 115 and 116 connected to the terminals 34, 35 formed by the strips 117a and b and 118a and b respectively on the panel. The terminal 116 is connected to the terminal 82 on the air chore choke 27 by the cable 119a. The terminal 115 is connected to the supply terminal 10. The conducting strips 117a and b are on opposite sides of the panel and are connected to the inductive resistor 28. The resistor 28 is separately connected by the strips 120a and b to the contact bars 26a and 26b respectively of the circuit breaker. The cable 121 connects the cathode of the rectifier 15 to the bar 26a and the strip 122 connects the bar 26b to the anode of the rectifier 16. The anode 22 of the rectifier 15 is connected by the strip 123 to the fuse 29. The cathode 21 of the rectifier 16 is connected to the same side of the fuse 29 by the cable 124. This completes the current path of the load current. The strips 117a, b, 118a, b, 120a, b, 122 and 123 are wide and are capable of carrying currents safely of at least 300 amperes. The contacts 34 and 35 are U-shaped and fit over the end of the panel 119 and overlap the strips 117a, b and 118a, b to provide wear resistant contact means for engagement by the socket.

The rectifiers 15, 16 are mounted on posts 125, 126 and fastened to the panel by means of bolts 127, 128. The rectifiers are provided with heat sinks 30, 31 respectively. In this embodiment the heat sinks are made of sheet copper and formed with two radially extending circular fins. The post 125 is electrically connected to the conductive strip 123. The post 126 is electrically connected to the strip 122.

The trigger circuit 18 has most of the conducting strips on one side of the panel 110 and the components on the other side with the leads extending through the panel to connect the components to the conducting strips. The lead 130, corresponding to terminal 14a, connects the anode 23 to the resistor 44 and to the rectifier 46.

The strip 130, which includes terminal 14a, extends from the anode 23 to the rectifier 46 and to the resistor 44. The strip 131, which includes terminal 14b, extends from the conducting strip 123 to the rectifier 47 and the resistor 45. The terminal 59 is formed by the strip 139 and extends between resistors 44, 45. The strip 36a, b forms the terminals 37a, b, 38a, b for connecting the trigger circuit to the contacts 114a, b, c of socket 114.

The secondary windings 53b, 53c of the pulse gate transformer each have one end connected to the strips 130 and 131 respectively. The other end of winding 53b is connected to the gate electrode 25 by the strip 132 and cable 133, and the other end of winding 53c is connected to the gate electrode 24 by the strip 134 and cable 135. The winding 53a is connected to the base 42 by strip 136 at one end and at the other end by the strip 140 including terminal 52 connecting the rectifiers 46, 47 condenser 54 and resistor 67. The resistor 67 is connected at the other end to the terminal strip 38a, b forming terminal 38. The terminal strips 38a, b are on opposite sides of the panel.

The condenser 54 is connected to the terminal strip 140 and to the emitter 41 by strip 137. The resistor 55 is connected between strip 137 and the terminal strip 37a, b forming the terminal 37 connected to the contact 114b of socket 114. The photoresistor 104 and resistor 105 are connected across the condenser 54 by connection between terminal strip 140 and strip 137.

The lamp 103, photoresistor 104 and resistor 105 are housed in a casing 138 supported on the panel by the connecting leads. The casing seals extraneous light.

The rear edge of the panel 110a fits into the socket 114 connecting the strips to the contacts.

Figure 3:
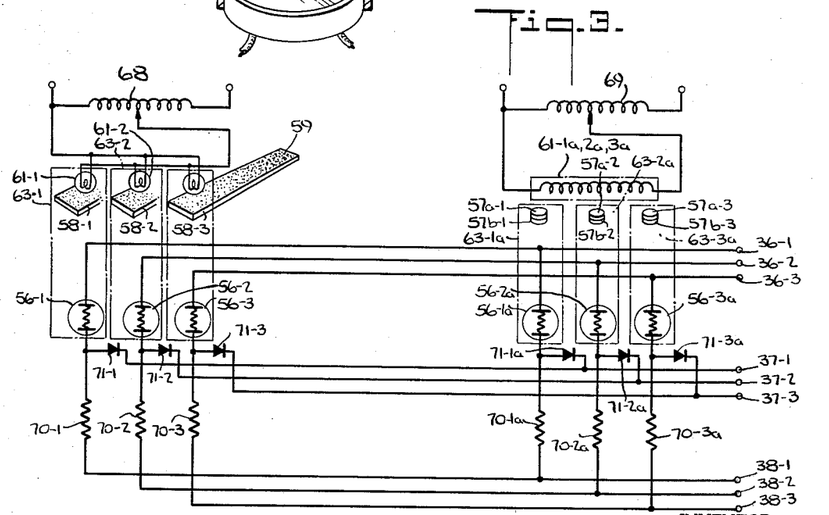
FIG. 3 is a diagrammatic view of the multiple adjusting for presetting the intensity of illumination of the lamps.
Figure 3A:
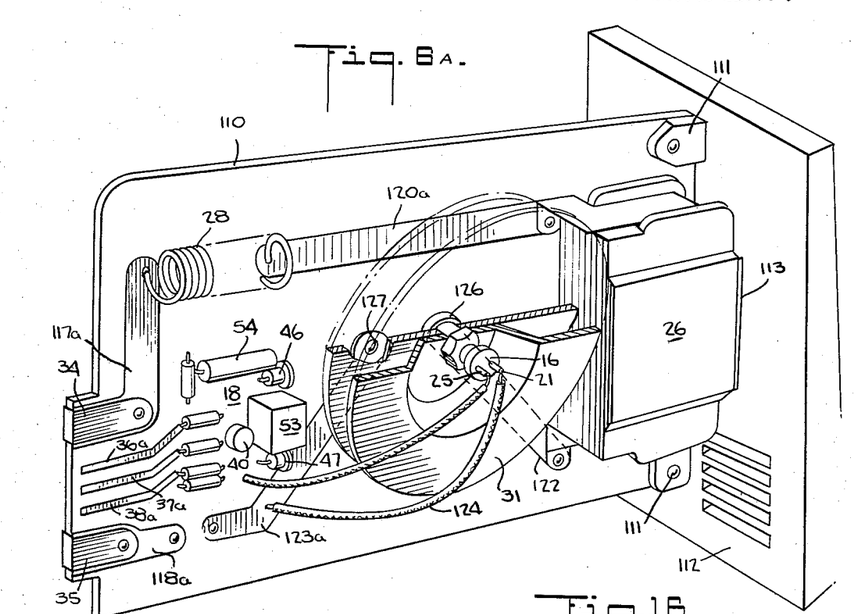

The terminal strips 36a, b and 37a, b and strip 38 engage contacts 114a, 114b and 114c of the socket 114 for connecting the dimmer to fading controls as illustrated in FIG. 3.

The lead 119a connects the strips 118a, b to the terminal 82 of the air core choke and the lead 119b from terminal 81 connects the choke to a patch panel 17 or the like. The patch panel has a terminal 17a for connecting the supply to the panel and thus to the lamp 12.

The I²T fuse 29 is illustrated in FIG. 16 and comprises two spaced base members 160 and 161. The base members are each made of one-half inch diameter silver plated copper cylinders which serve as heat sinks. These bases are fastened to conducting strips 118a, b and 123a, b repectively. The bases are spaced a distance A' apart to form a small air gap preferably one-sixteenth of an inch between them. The bases have flat surfaces 162, 163 with threaded holes 164, 165 to receive bolts 166, 167. On the base 161 a bobbin member is held in place by the bolt 167 and has an open ended inner chamber 169. A bobbin of pure silver wire is wound in a coil and placed in the chamber of the bobbin to freely rotate about bolt 167. About three-quarters of an inch of wire is pulled out and extends from base 160 to base 161 and is held in place by the bobbin member 168 under the pressure of the bolt 167 and the cylindrical clamping block 171 under the pressure of the bolt 166.

The wire 170 has a size that will carry normal currents without heating. The heat sink effect of the bases absorbs the heat of the small wire faster than the normal currents develop heat in the wire. On an overload current the heat developed increases at a rate faster than it is absorbed by the heat sinks and it will accumulate to a point where it will melt the wire and open the circuit. On a sudden high overload it will fuse before the current reaches the burn out point of the silicon controlled rectifiers. This point selected is above the point that the trigger retarder, air choke and breaker combination fuses, but below the fusing of the rectifiers. Thus the fuse is a safety device in case the air core choke or trigger retarder is not functioning or the circuit breaker is not operative. In view of the bobbin form of the fuse wire the fuse is easily renewed by unrolling the wire and reclamping it between the cylindrical members and the bases 160 and 161.

Figure 5:
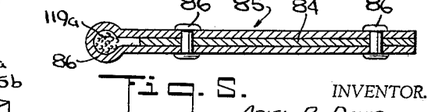
FIG. 5 is a sectional view of the terminal on the air core choke taken along lines 5—5 of FIG. 4.

The mounting of the air core choke and the connection of the leads 119a and b are illustrated in FIGS. 4 and 5. The coil is mounted in a circular bracket 75 with leg portions 75a and b fastened to a beam or shelf 83 in any suitable manner, such as by bolts 83a. The ends of the bracket are held together by a bolt 77 and a nut 79. A stiff helical spring 78 is provided to resiliently hold the ends of the brackets together to permit expansion and contraction of the bracket with the change in size of the air choke on heating and cooling. An insulating layer 80 separates the bracket 75 from the choke to prevent the circulation of any current in the bracket 75, and the bolt 77, nut 79 and spring 78 are also insulated from the bracket to prevent circulating currents. The leads 119a and b are connected to the respective ends of the air core choke by the terminals 82 and 81 which are identical. The terminal 81 is illustrated in FIG. 5 and comprises a copper U-shaped member 85 extending along opposite sides of the aluminum strip 84 and having an eyelet 86 for receiving the ends of the cable 119a. The member 85 is riveted to the aluminum strip 84 by the rivets 86 and a secure electrical contact is attained between the member 85 and the aluminum strip 84 by removing the insulating aluminum oxide layer on the strip 84 and soldering the member 85 to the strip 84. The cable 119a can be fastened in the eyelet 86 in any suitable manner.

The control resistor may be one of a number of different means that has a variable resistance. Preferably the resistance should vary linearly. The resistor may be photo-conductive cell type resistor responsive to variations in light intensity, or a variable resistance transistor or a potentiometer having a variable contact or the like.

Figure 2:
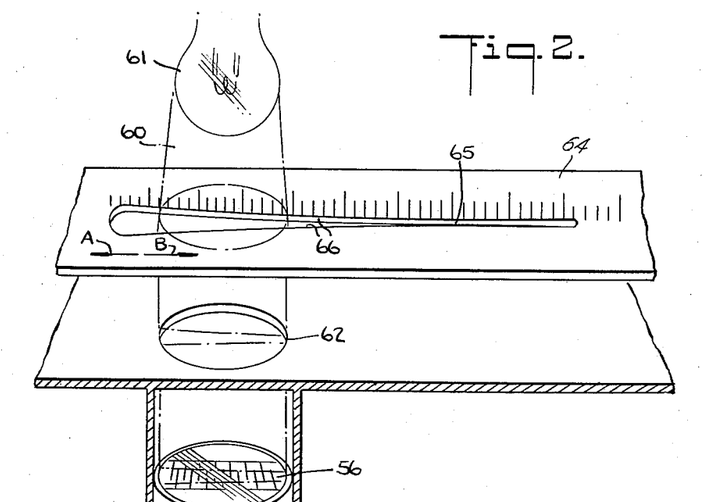
FIG. 2 is a schematic illustration of the illumination presetting or adjusting means.

In the preferred embodiment illustrated in FIG. 1 the control resistor is a photo-conductive cell type resistor. A variable intensity light beam is directed on the cell to produce a range of resistance values. For the purpose of setting the intensity of illumination of stage lights a beam 60 from a constant source of light 61 is directed through an opening 62 (FIG. 2). A strip 64 having teardrop shaped slot 65 may be positioned above the opening to restrict the light impinging on the cell. The resistor 56 extends generally longitudinal to the slot and is only a small fraction of the length of the slot. The beam 60 passes in part through the slot to impinge upon the resistor. The amount of light passing through the slot is determined by the position of the slot. As the strip is moved in direction A the light impinging on the resistor decreases and the resistance increases. This increases the time required for charging the condenser 54 thereby delaying the discharge of the condenser and the formation of the firing pulse. As previously described, the later the firing pulse occurs in the half cycle the less load current that passes through the silicon controlled rectifiers. This lowers the intensity of illumination of the lamps.

When the strip is moved in direction B the wider portion of the slot is positioned between the beam and the photo-conductive resistor and more light impinges on the resistor decreasing its resistance and shortening the period to charge the condenser, thus producing the firing pulse earlier in the half cycle. The change in resistance of resistor 56 is substantially linear. The sides or edges 66 of the slot are curved to produce a linear change in the light impinging on the resistor 56. However, the slot may be shaped to produce other variations in the current. The illumination of the lamp changes substantially linearly.

An advantage of the photocell and the teardrop slot combination with lamp is that an infinite number of settings may be provided rather than a step type of selection as in the present automatic programming type of systems. Also the presetting unit is small and compact and requires only a few parts for a wide range of settings.

In the embodiments described herein the invention is specifically applied to the adjustment of the intensity of illumination of theater and stage lights. The preferred embodiment is readily adapted to the presetting of the intensity of illumination of a set of lights controlled by one component as shown in FIG. 1. The resistor 67 is connected between the rectifiers 46, 47 and the terminal 38. A plurality of photocells may be connected to the terminals 38, 37, 36 as illustrated in FIGS. 1 and 3. The photocells 56a, b are connected in series with resistors 70a, b respectively between the terminals 36, 38. Diodes or rectifiers 71a, b are connected to the terminal 37 and a respective series combination of resistor and photocell.

Each photocell 56a, b independently controls the degree of illumination. The cells are mounted in separate lighttight compartments 72a, b opposite the respective openings 62a, b. Light control strips 64a, b are provided for each opening and photocell. For each photoconductive cell 56a, 56b a separate lamp 61a, b is provided and positioned opposite the respective openings 62a, b. The amount of light impinging upon a respective photocell is determined by the position of the strips 64a, b with the teardrop shaped slot edges 66a, b and the setting of the potentiometers 73a, b. The potentiometers are connected to a current source 74.

The individual strips 64a, b may be preset to determine in advance the degree of illumination of the stage lights. The lamps 61a, b are lighted depending upon which preset condition is desired. In order to provide a smooth transfer from one preset condition to another, a standard fading type of circuit may be used. In this arrangement one lamp is gradually decreased in intensity while the other lamp is increased by adjustment of the potentiometers 73a, b. The photocell receiving the greater illumination controls the illumination of the lamp load. At equal intensities both photocells will operate and control the lamp load, and then as the fading is continued the photocell of the selected preset will control the degree of illumination of the lamp load. The series combinations of the resistors 70a, b and the photocells 56a, b connected across the terminals 38 and 36 each forms a voltage dividing network. The photocells are connected into the condenser charging circuits by the diodes 71a, b. The photocell with the least resistance will block the diodes of the other photocells and render its respective diode conductive so that the condenser charging current will pass through the low resistance photocell and thus determine the presetting of the lamp load.

In FIG. 3 a multiple presetting circuit is illustrated. The photocells 56–1, –2, –3 are each connected to a different control apparatus. The conductivity of the photocells is, however, controlled by a single master control autotransformer 68 which is connected to the lamps 61–1, 61–2, 61–3. The present intensity of the light impinging upon the photocells 56–1, 56–2, 56–3 may be predetermined by the positioning of a teardrop shaped slot 65 on a slide or strip 64, as illustrated in FIG. 2, or by a strip 58 having a variable density translucent or transparent film 59, as illustrated in FIG. 3. The autotransformer 68 may be varied from zero voltage to full voltage and the lamps controlled by the respective photocells will have the desired illumination at the full voltage. In the other preset a further embodiment of the light control is illustrated. Two polarized members may be positioned between a light source and photocell with the polarized disc members 57a, b rotatable in relation to one another to vary the amount of polarized light transmitted over a range to adjust the load lamps from full bright to blackout. Thus a programming card may be easily adjusted to set the intensity of individual lamps and readily reset without destroying the card or altering the other settings. Also electrostatic method may be used in which the polarization of a liquid film is altered in response to the amount of light transmitted through the film.

A second set of photocells 56–1a, 56–2a, 56–3a may be provided in series with resistors 70–1a, 70–2a and 70–3a and connected to the respective control apparatus that the photocells 56–1, –2, –3 are connected to. For example, the photocell 56–1 and resistor 70–1 are connected in series across the terminals 36–1 and 38–1 and the photocell 56–1a and resistor 70–1a are also connected in series across the same terminal. Correspondingly the other photocells and resistors are connected across terminals 36–2 and 38–2 and 36–3 and 38–3. The photocells 56–1a, –2a, and –3a are controlled by the lamps 61a which may be of the tubular type so that a single lamp provides illumination for each of the photocells. The intensity of illumination impinging on a respective photocell is controlled by the disc members 57ab–1, 57ab–2 and 57ab–3 respectively. The lamp 61a produces polarized light on passing through member 57a. The intensity of illumination of the lamps 61a is controlled by the autotransformer 69. Thus the lamps may be changed from one preset condition to a second preset condition by simultaneously adjusting the autotransformers 68 and 69 in opposite directions. This may be done in any well known conventional manner.

The rectifiers 71–1, 71–1a are connected to the terminal 37–1 and to a respective photocell 56–1, 56–1a to function in a manner similar to the functioning of the rectifiers 71a and b described in connection with FIG. 1 to provide for the control of either photocell 56–1 and 56–1a. The other photocells are correspondingly provided with rectifiers 71–2, 71–2a connected to terminal 37–2 and rectifiers 71–3 and 71–3a connected to terminal 37–3.

In this embodiment three photocells have been illustrated for each preset unit. However, it is understood that any number of photocells may be used.

The strip 58 may have a variable light density instead of the variable density film. This variation in density longitudinal of the strip may be formed in any suitable manner. The longitudinal variation of the density may be set depending upon the desired relationship between the control voltage and the lamp illumination. As in FIG. 1 the photocell and the respective light intensity control strip are enclosed in lighttight compartment cells 63–1, 63–2, 63–3 and 63–1a, 63–2a, 63–3a.

The charging current passed by the photoresistor may be controlled by the variation of the intensity of incandescence of a single miniature, low voltage, low wattage lamp. In this system the incandescence of the lamp may be changed from one level of intensity to another by varying the voltage of the lamp by means of variable resistors and transformers formed into standard presetting equipment.

In the foregoing embodiment the choke 27 has been described in connection with a back to back connection to the silicon controlled rectifiers. It is, however, of course understood that the invention may be applied to other types of circuits using silicon controlled rectifiers used for controlling the passage of current.

Figure 7:
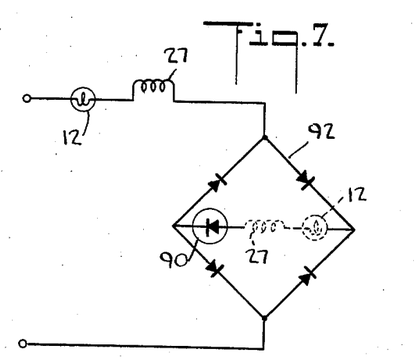
FIG. 7 illustrates a full wave bridge circuit with the load and/or the air core choke either in the A.C. or D.C. line controlled by a single rectifier.

In FIGS. 7 to 12 the choke is illustrated in combination with various types of circuits. In FIG. 7 the air core choke 27 is shown in combination with a full wave bridge circuit 92 with the silicon controlled rectifier 90 in the D.C. portion of the bridge. The lamp load or the air core choke may be either in the A.C. line or in the D.C. line.

Figure 8:
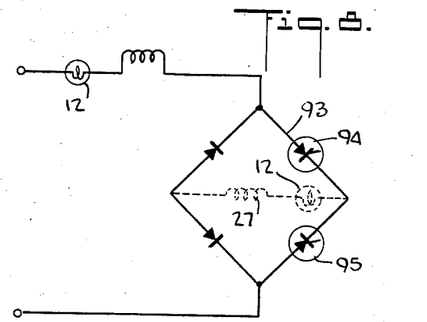
FIG. 8 illustrates a full wave bridge circuit with the silicon controlled rectifiers having common gate circuits and the air core choke and/or load in either the A.C. or D.C. portion of the circuit.

In FIG. 8 a full wave bridge circuit 93 is illustrated with the silicon controlled rectifiers 94, 95 in two of the legs of the bridge with common cathodes. The air core choke 27 is connected either in one of the A.C. lines or in the D.C. line. In each of these embodiments the load 12 may be in the A.C. line or in the D.C. line.

Figure 9:
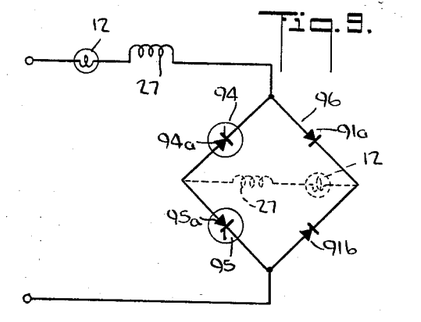
FIG. 9 illustrates a full wave bridge circuit with the silicon controlled rectifiers having isolated gate circuits and the air core choke and/or load in either the A.C. or D.C. portion of the circuit.

In FIG. 9 a full wave bridge circuit 96 is illustrated with uncontrolled rectifiers 91a, b in adjacent legs and the silicon controlled rectifiers 94, 95 in the other adjacent legs. The anodes of the rectifiers 94a, 95a are common. The load 12 and the air core choke 27 may be in either the D.C. line or the A.C. line as indicated by the dotted lines.

Figure 10:
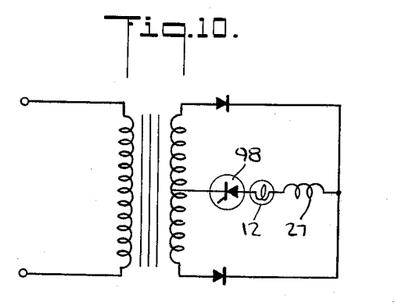
FIG. 10 illustrates a single silicon controlled rectifier with two ordinary rectifiers and with the load and air core choke in the D.C. portion of the circuit.

In FIG. 10 there is illustrated a full wave push-pull bridge circuit 97 with the silicon controlled rectifier 90a located in the D.C. leg and the air core choke 27 in the D.C. line.

Figure 11:
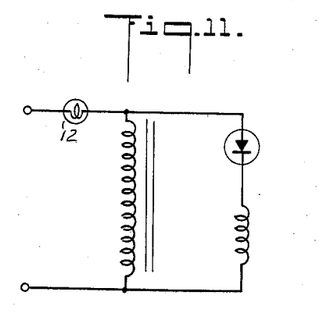
FIG. 11 illustrates a single silicon controlled rectifier and a parallel reactor producing a full wave output.

FIG. 11 illustrates a high impedance choke 98 of the iron core type in series with the load 12. The air core choke 27 and the silicon controlled rectifier 93b in series therewith are connected in shunt across the choke 98. When the rectifier is fired the D.C. component lowers the impedance of the choke 98 and conducts for a full cycle or for a portion thereof depending on the firing angle of the controlled rectifier.

Figure 12:
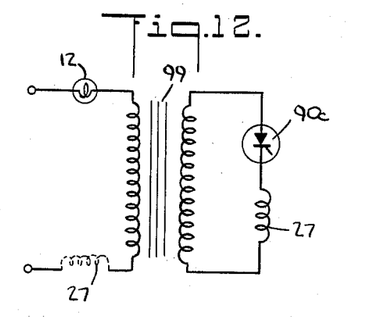
FIG. 12 is a series transformer with a single silicon controlled rectifier and air core choke for control of the unit in either the A.C. or D.C. portion of the circuit.

FIG. 12 illustrates a simplified circuit of a series transformer 99 shown using a single silicon controlled rectifier 90c. The air core choke 27 may be in either the A.C. or D.C. line. The transformer 99 can have either a step up or down ratio to control high voltages or high amperages as may be desired.

Figures 13, 14, 15:
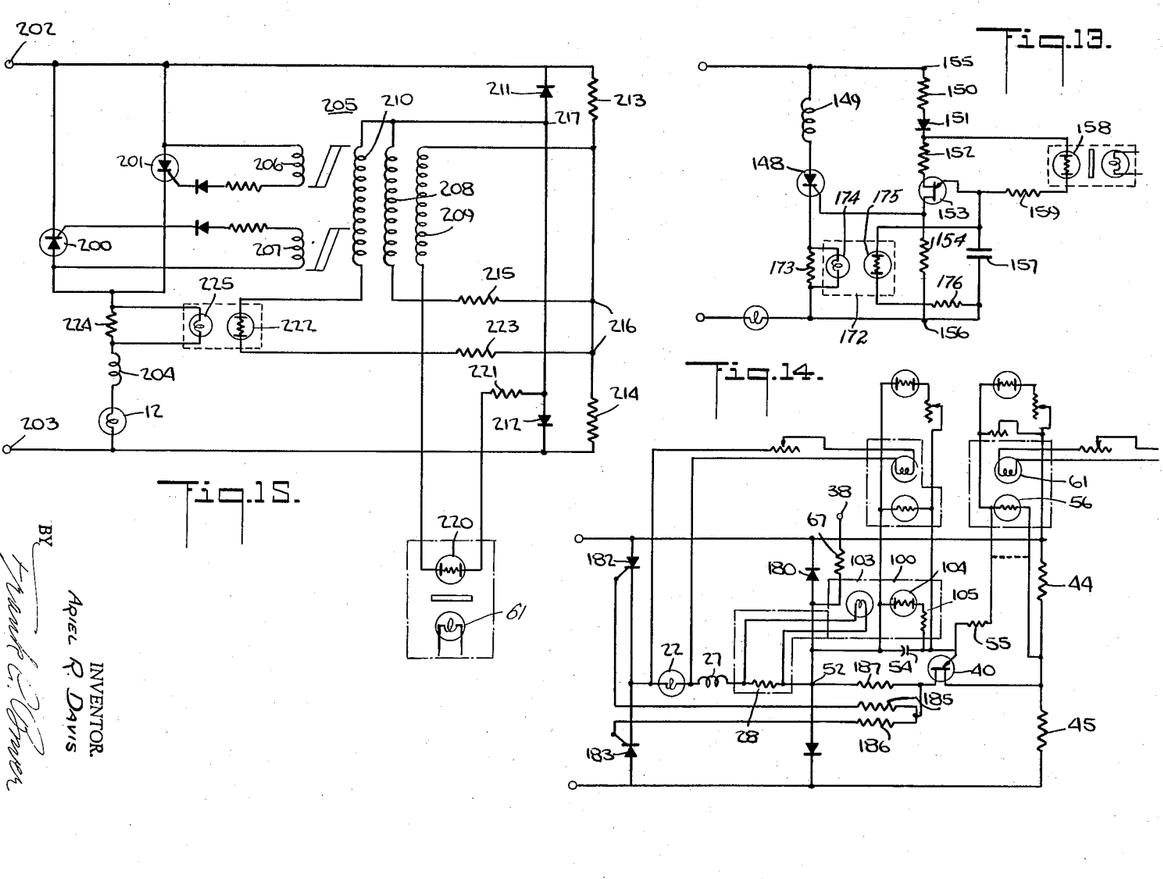
FIG. 13 illustrates a triggering circuit for a single silicon controlled rectifier.
FIG. 14 is a common gate triggering circuit.
FIG. 15 illustrates simplified magnetic amplifier controls illustrating a photoresistor for control.
Figure 17:
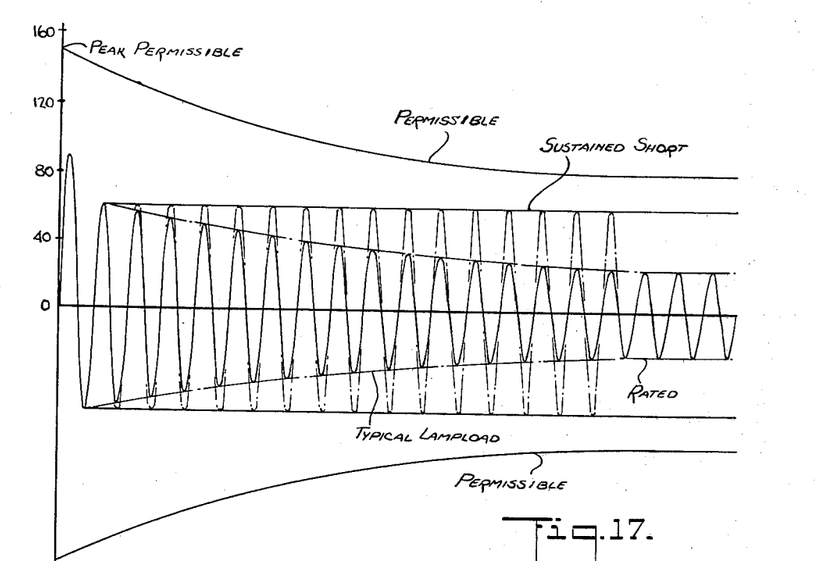
FIG. 17 illustrates the output wave form of the embodiment of FIG. 1.

In FIG. 13 a simplified trigger circuit is illustrated for firing a single silicon controlled rectifier 148 in series with an air core choke 149. This circuit comprises a resistor 150, uncontrolled rectifier 151, resistor 152, a unijunction transistor 153, and a resistor 154. These components are connected across the input terminals 155, 156 but do not pass current since the unijunction transistor 153 blocks the flow of current. The condenser 157 is connected across the cathode of the unijunction 153 and the resistor 154 connected to the gate electrode. The photocell 158 is connected in series with resistor 159, across the resistor 152 and the cathode of the unijunction transistor to provide a path for current to charge the condenser 157. When the condenser has reached the discharge potential by firing the unijunction transistor, current flows through resistor 154 to produce a triggering pulse firing the silicon controlled rectifier 148.

A trigger retarding circuit 172 may be provided similar to the trigger retarding circuit 100 of the embodiment shown in FIG. 1. The inductive resistor 173 is connected in series with the silicon controlled rectifier 148. The lamp 174 is connected across the inductive resistor to cast a beam of light on the photocell 175 when a surge current occurs the lamp lights. A resistor 176 is connected in series with the cell and across the condenser 157. The trigger retarder circuit functions in a similar manner to the one of FIG. 1.

In FIG. 14 a modified form of trigger circuit is shown for use in D.C. circuits where the control rectifiers have common cathodes. The modified circuit functions in a similar manner to the circuit of FIG. 1 except that three resistors 185, 186, 187 are substituted for the three windings of transformers of FIG. 1. The elements which function in the same manner as the corresponding elements of FIG. 1 have the same reference numerals as those elements.

A single control photocell 56 is shown. However, if a plurality of photocells are used terminal 38 and resistor 67 are provided connected to junction 52. In this circuit uncontrolled rectifiers 180 and 181 are connected to provide direct current through the single air core choke 27. The silicon controlled rectifiers 182 and 183 are connected in series with the air core choke 27. The gate transformer is replaced by three resistors 185, 186 and 187. Resistors 185 and 186 are connected between the resistor 187 and the unijunction transistor 40. The voltage pulse produced on discharge by the condenser 54 across the resistor 187 is applied to the gate electrodes and cathodes of the silicon controlled rectifiers 182, 183 by the resistors 185 and 186. The polarity of the pulse applied to the two silicon controlled rectifiers is the same and the selection of the rectifier to fire depends on the polarity of the rectifier. When controlled rectifier 182 conducts current flows through the rectifier 181, air choke 27, the load 12 and controlled rectifier 182. When the controlled rectifier 183 conducts, current flows through the rectifier 180, air choke 27, load 12, and controlled rectifier 183.

The trigger retarding circuit 100 is connected across the impedance 28 to apply a voltage to the lamp 103 for producing a light beam impinging on the photocell 104. The resistor 105 is connected in series with the cell and functions the same as current limiting retarder in FIG. 1.

The shunt control circuit can be used for other types of control and regulation. The photoresistor can be exposed to the daylight so that the lights will be turned on in response to the lessening of the sunlight due to the sun setting or due to clouds. By feeding the output of the circuit through an adjustable impedance to a lamp, the load can be adjusted to the output voltage. This requires the system to be operated slightly below full voltage of the circuit in order to provide a range for the voltage control to function. As the line voltage drops the resistance will increase advancing the trigger pulse, increasing the load current. On an increase in line voltage the control lamp will increase in illumination and decrease the resistance retarding the firing of the rectifiers. In the operation of the circuit for sensing daylight or other lighting conditions the input current from the resistors 44, 45 is fed by a shunt directly to the condenser through the resistor 55. The daylight control can also be used to turn signs on and off and the degree of illumination required can be determined by the adjustable resistor in series with the photocell.

In FIG. 1 the intensity of light impinging on the photoresistor or cell is determined by the setting of the light transmitting element 64. The potentiometers 73 are used to vary the applied voltage from zero to full value. The light intensity impinging on the photoresistor may be determined by the degree of illumination of the lamp 61. The lamp 61 may be connected to any independent control unit such as a potentiometer or autotransformer.

In FIG. 15 a magnetic amplifier trigger circuit is shown for firing silicon controlled rectifiers 200 and 201 connected in back to back relation across the input terminals 202, 203. The air core choke 204 and lamp load 12 are in series and in series with each silicon controlled rectifier. The magnetic amplifier 205 comprises anode windings 206, 207, bias winding 208, control windings 209, and trigger retarding winding 210. The rectifiers 211, 212 are connected in back to back relation across the input terminals to pass alternate half cycles. Resistors 213, 214 are connected in series across the input terminals to form with the uncontrolled rectifiers 211, 212 a full wave rectifier. This rectifier may be connected to a current supply separate from the current supply of the silicon controlled rectifiers. The bias winding 208 is connected in series with a current limiting resistor 215 between terminals 216, 217 located between the rectifiers and resistors respectively. The magnetic amplifier is in a condition to fire the rectifiers at full load current. The anode windings are connected across the silicon controlled rectifiers and in series with rectifiers and current limiting resistors to pass current. The current biases the silicon controlled rectifiers to pass full bright load current. The bias winding provides flux countering the flux in the anode windings to render the silicon controlled rectifiers nonconductive. The control winding 209 is connected in series with the photoresistor 220 and resistor 221 between terminals 216, 217. The photoresistor varies the current in the control winding causing the magnetic amplifier to fire the rectifiers from full bright to cut off. The trigger retarder winding 210, a photoresistor 222, and a resistor 223 are connected between the terminals 216, 217 and are in a nonconducting state. The photoresistor is illuminated by the lamp 225 connected across an inductive resistance 224 in series with the silicon controlled rectifiers, and provides current to the lamp 225 on a surge current to illuminate the lamp, and produces a current through the trigger retarder winding to retard the firing of the pulse and render the rectifiers conductive for a short portion of the half cycle. This functions similar to the trigger retarder of FIG. 1 and cooperates with the air core choke to provide a current above rated values but less than the permissible values of current. The photocell may be connected for presetting and the conductivity controlled in similar manner to FIG. 1. The magnetic amplifier is extremely small in size, being slightly larger than the silicon controlled rectifier. The overall size of the trigger circuit is approximately the same as the trigger circuit illustrated in FIG. 1 and may be substituted therefor.

The apparatus may be easily and inexpensively manufactured and easily mounted in a supporting casing. The various triggering circuits illustrated and described have a minimum of components. The components are small in size and may be positioned in a small space. The components are connected wherever possible by conducting strips. The particular feature of this invention is the formation of the load current carrying connectors in the form of printed strips along with the connectors for the trigger circuits. The connections to the gating electrodes and the cathodes are in the form of flexible wires or cables. Thus the main current carrying members and the control members are all formed in a single chemical process. The other components are added by drilling holes at the proper locations and soldering the leads to the connecting strips.

A further feature of the apparatus is that the strips are extended to the edge of the mounting panel to form the plug portion of the connection between the photocell control unit, power supply and the air core choke. Thus at same time that the connecting strips are formed the plug portions of the main connector are formed. The thin mounting panel permits the formation of conducting strips on both sides of the panel to engage the socket portion while the panel between the strip also forms a portion of the plug. Thus a plug is formed with an intervening insulating member with the insulating member also used to support other components of the apparatus. The thin insulating mounting panel is readily supported in a vertical position and the silicon controlled rectifiers extend horizontally normal thereto. This positions the cooling heat sinks vertical. Thus cooling air readily flows past the connectors and also through the heat sinks. Any possible heating is removed by convection current. Ventilating slots are provided in the front panel to admit circulating air. The mounting of connecting strips on opposite sides provides a simple connection of the main current carrying members to opposite sides of the circuit breaker. The breaker is positioned to extend through the front panel for manual actuation. All the connectors are mounted on the mounting panel with external connections being made only through the plug portion. Thus the unit is self-contained without any additional disconnects to be made on separation of the unit from the supporting chassis.

As to the plug portion and socket, the socket has a plurality of spaced finger contacts fitting over the end of the panel to grip the conductive strips. The multiple gripping of the conductive fingers provides a positive known engagement of the current carrying members to prevent overheating of the plug.

The air core choke may be mounted separately and preferably above the control unit to provide for heat dissipation without affecting the other components. The leads extend to the choke and to the power input.

Thus the control unit forms the conductive members by electrochemically removing the copper. The ends of the strips are load current carrying members which may be riveted for additional safety in retaining the strips on the mounting panel. The leads from the components are soldered to the connecting strips.

As a protective means to prevent disconnection of the socket with full load current the leads connecting the trigger circuit to the control circuit terminate short of the edge of the panel so that the trigger circuit is first disconnected stopping the firing of the silicon controlled rectifiers before the load current carrying means are disconnected.

In connection with the photocells 56 or 103 various type of light sensitive means may be used which change in conductivity on impingement of light or other types of radiant energy. Such devices may be photo-resistors, photodiodes p-n type, photo transistors p-n-p type or other solid state types of radiant energy sensitive devices which for the purposes of this invention are considered equivalent. As previously described, two polarized disc members may be superimposed and rotated relative with one another to provide a range of light intensities impinging on the photocell.

One of the advantages of utilizing these light sensitive means having variable resistances is the wide variation of resistance that is produced. The range of resistance may be varied gradually in a stepless fashion to produce a stepless control and variation of the illumination of lamps. Further, it provides a simplified conversion of a variable A.C. signal to a D.C. signal without the use of filter circuits and transformers and the like. Also, physical elements may be used to intercede between the light beam and the light sensitive unit and adjust the amount of light impinging on the photocell. This interceding element is movably mounted and has a variation in transmitting qualities in the direction of movement. The length of travel required to produce the desired variation in light may be set over any range desired for intended use. Further, the element may produce any type of relation between the movement of the element and variation in illumination by the distribution of the light transmitting characterstics. The setting of the physical element determines the particular illumination. Thus in the presetting of the lamps the physical element may be manually positioned to secure the desired effect. Thus any lighting relation may be secured without complicated or intricate circuits.

A number of photocells may be connected to a single control unit, as illustrated in FIGS. 1 and 3, by having the photocells interconnected by resistors and rectifiers, one resistor and rectifier for each photocell. In this circuit the photocell with the lowest resistance controls the firing of the rectifiers and the other photocells are blocked. Thus a simple presetting is provided and by varying the current supplied to the lamps illuminating the cell the control of the illumination may be shifted from one set of photocells to another.

Thus the combination of a long control element and a simple electric circuit is provided for controlling the illumination of lamps over any desired dimming characteristic.

Thus the apparatus is small in size and versatile in operation without interference between a multiplicity of operating units or inconvenient failure due to excessive currents and with a proper relation between the illumination of the lamps and the control element.

In the foregoing specific embodiments an air core choke is in series with the silicon controlled rectifiers. This serves to prevent excessive surge current and to suppress raido frequency and transient voltages to the triggering circuit. The control unit with the silicon controlled rectifiers may be used without the air core choke and currents may be controlled effectively. The external circuit may not produce surge currents and therefore there is no necessity for the air core choke. If a multiplicity of control units are used, other types of suppression devices may be used.

As seen from the foregoing description the air core choke provides a constant impedance in series with the silicon controlled rectifiers to present a short time constant on passage of rated currents and a long time constant on passage of overload currents. The choke modifies the increase in load current on conduction of the silicon controlled rectifiers to relay the increase and thereby eliminate the audible lamp filament vibrations and the production of radio frequencies. The choke is also quiet in operation and does not produce any hum or other noises. The choke, in addition to preventing these interferences, also permits the load current to follow substantially sinusoidal values except as modified by the angle of conduction. This feature is desirable in view of transmission of the current through equipment connected to the output such as transformers.

Another feature of the choke is the prevention of interference between a plurality of dimmers. Single control units are seldom used. In most installations a large number of control units are used and operated simultaneously or separately. The firing of one set of controlled rectifiers in one dimming unit will often cause the rectifiers in other units to fire. The air core choke suppresses transient voltages so that only the associated triggering circuit controls the rectifiers. Thus the choke not only protects the rectifiers from excessive currents but also protects the rectifiers from transient voltages.

If the characteristics of an iron core choke are desired, it may be substituted for the air core choke in the various embodiments. The value of the inductance should be chosen to limit the peak current to a value below the destructive value of the silicon controlled rectifiers on dead short circuit at full line voltages.

In the description of the various embodiments using two silicon controlled rectifiers a single air core choke is connected in series with the rectifiers and passes alternating current. Thus one choke protects two rectifiers. However, two air core chokes may be used, each in series with a respective rectifier. For example, in FIG. 1 legs 13 and 14 may each have a separate choke in series with a respective rectifier.

The trigger retarder also functions to limit surge currents after the first half cycle by delaying the firing of the rectifiers to permit a limited surge current below permissible values. The choke provides an additional modification and limitation of the current values.

Although in the specific embodiments the circuits have included the combination of an air core choke and trigger retarder, the overload currents can be limited to permissible values by an air core choke without a trigger retarder. The impedance of the choke is larger to increase the time constant of the coil and hold the peak current within the permissible range. However, the combination of the air core choke and trigger retarder is preferred because of lower voltage drop across the choke on normal currents.

The air core choke isolates the rectifier from other transient conditions and prevents hindrance with other apparatus.

The photocell control of the firing angle of the silicon controlled rectifiers and the presetting circuit combining a number of photocells for individually and separately controlling the illumination permit a simplified programming. This programming may be accomplished in several different ways. Referring to FIG. 3 the strips may be positioned by a card having predetermined setting. Thus while one set of photocells is controlling the illumination the light transmitting strips of the other set may be altered by the card settings. Another method is to mount the light transmitting strips on the cards or plaque at the desired setting and then insert the card or plaque for setting the next scene. From these brief descriptions the light transmitting element need only be positioned to secure the desired illumination.

The foregoing embodiments provide an illumination control for tungsten filament type incandescent lamps that steplessly varies the illumination from blackout to full bright and from full bright to blackout without producing filament noise or creating frequency signals that interfere with public address systems and the like. The control unit may be connected to cold filaments or hot patches without the rectifiers fusing or the circuit disrupting means disconnecting the dimmer control unit. A plurality of dimmer controls may be used simultaneously without one dimmer tracking another. The cross fading and presetting is readily accomplished. Thus all the requirements for proper commercial dimming are met.

Silicon controlled rectifiers have been described in connection with the various embodiments. However, the inventions are applicable to other solid state controlled devices of the type requiring firing voltages to render the devices conductive and ceasing to conduct only on the removal of the applied voltages. The other rectifiers in the various circuits for converting alternating current to direct current or limiting current flow to a single direction are of the uncontrolled type.

Although the foregoing inventions have been described in connection with the control of illumination of incandescent lamps, the invention described herein may be applied to controlling other types of loads.

I claim:

1. Electrical control apparatus for controlling the current applied to a load comprising silicon controlled rectifiers to pass alternate halves of an alternating load current, a constant impedance choke in series with said silicon controlled rectifiers to pass the load current, said choke having a short time constant to normal rated current through said silicon controlled rectifiers and a long time constant to overload currents through said silicon controlled rectifiers and limiting the rate of rise and the peak values of the currents passed by said silicon controlled rectifiers, triggering means for providing triggering pulses variable in phase relation with the voltage applied to said silicon controlled rectifiers to control the period of conductivity of said silicon controlled rectifiers, trigger retarding means including an impedance in series with said silicon controlled rectifiers for applying on the occurrence of a surge current initially limited to a permissible peak value by said choke a signal to said triggering means to retard the triggering pulse to permit the passage of current through said silicon controlled rectifiers greater than the rated values of current and less than permissible maximum values for discontinuing the passage of current in excess of rated values.

2. Electrical control apparatus as set forth in claim 1 wherein said choke is of the air core type.

3. Electrical control apparatus as set forth in claim 2 wherein said air core choke comprises a metallic strip having a low electrical resistance and wound in overlapping turns to produce a flux on passage of current and having a constant impedance for maintaining a load current below the maximum permissible current values of said rectifiers.

4. Electrical control apparatus as set forth in claim 2 wherein said air core choke comprises anodized aluminum strip having a low electrical resistance and wound in overlapping turns to provide a constant impedance for maintaining a peak load current below the maximum permissible current values of said rectifiers.

5. Electrical control apparatus as set forth in claim 1 wherein said triggering means includes a photoresistor for varying the phase relation of said triggering pulses in response to the intensity of radiant energy impinging on said photoresistor.

6. Electrical control apparatus as set forth in claim 1 wherein a circuit breaker is provided having two current sensitive windings each in series with a respective silicon controlled rectifier to solely sense the current passing through the respective silicon controlled rectifier, each of said windings passing a half cycle of one polarity to sense the rated current at twice the value and sense the overload current at the peak value of a half cycle, and contact means in series with said silicon controlled rectifiers to disconnect said silicon controlled rectifiers from a current source, said contact means being actuated by either winding to disconnect the rectifiers on occurrence of a surge current.

7. Electrical control apparatus as set forth in claim 1 wherein said trigger retarding means includes a photoresistor means connected to said triggering means to vary the phase relation of the triggering pulses and voltage applied to said silicon controlled rectifiers and an illuminating means connected to said impedance to receive a voltage therefrom on occurrence of a surge voltage to radiate energy altering the conductivty of the photoresistor for retarding trigger pulses produced by said triggering means to provide a load current greater than the rated values and less than the permissible maximum values.

8. Electrical control apparatus as set forth in claim 1 wherein said triggering means comprises two uncontrolled rectifiers in back to back relation in parallel with said silicon controlled rectifiers, two resistors connected in series across said uncontrolled rectifiers forming a bridge network, a condenser and a photoresistor connected between the connection of said common electrodes of said uncontrolled rectifiers and the connection between said resistors to form a direct current path for charging said condenser, a gate transformer having a primary winding and secondary windings connected to a respective silicon controlled rectifier for impressing triggering pulses thereon, a unijunction transistor having an emitter and two base electrodes, said primary winding connected in series with base unijunction electrodes between said uncontrolled rectifiers and said resistors, said condenser connected across said primary winding and said unijunction emitter to apply a voltage of a predetermined value in timed relation to an applied load voltage depending on the conductivity of said photoresistor.

9. Electrical control apparatus as set forth in claim 1 wherein said triggering means comprises two uncontrolled rectifiers in back to back relation in parallel with said silicon controlled rectifiers, two resistors connected in series across said uncontrolled rectifiers forming a bridge network, a condenser and a photoresistor connected between the connection of said common electrodes of said uncontrolled rectifiers and the connection between said resistors to form a direct current path for charging said condenser, a third resistor, a unijunction transistor having an emitter and two base electrodes, said third resistor and said base electrodes connected in series between said uncontrolled rectifiers and said first two resistors, said condenser connected across the third resistor and said emitter to provide a discharge current path for the condenser voltage, and resistor means connected between said silicon controlled rectifiers and said unijunction transistor for applying triggering pulses created across said third resistor on discharge of said condenser when the charging current controlled by said photoresistor provides the predetermined voltage across said condenser.

10. Electrical control apparatus for controlling the load current supplied to an incandescent lamp load comprising at least one solid state controlled device for controlling the amount of load current, an inductive means having a short time constant to normal rated current values of said solid state controlled device and a long time constant to overload currents and limiting the rate of rise of current, triggering means for providing triggering pulses variable in phase relation to the voltage applied to said solid state controlled device to control the amount of load current, trigger retarding means including an impedance in series with said solid state controlled device for applying a signal to said triggering means to retard the triggering pulses on the occurrence of a surge current to permit the passage of current through said solid state controlled device greater than the rated values of current and less than permissible maximum values for discontinuing the passage of current in excess of rated values.

11. Electrical control apparatus as set forth in claim 10 wherein one solid state controlled device is provided and said inductive means in series therewith across a voltage input, and said triggering means is connected in parallel with said series rectifier and inductive means and comprising a diode rectifier, a unijunction transistor and a first resistor in series across the input, series connected photoresistor and capacitor connected in parallel with said unijunction transistor and said first resistor to provide a current charging path with the rate of charge determined by said photoresistor, said capacitor connected across said emitter and said first resistor to provide a discharge current path to create trigger pulses in said first resistor and means for applying said pulses to said solid state controlled device to control the conductivity thereof.

12. Electrical control apparatus as set forth in claim 11 wherein said triggering means includes light responsive device varying the amount of current passing therethrough on varying the impingement of light thereon, an illuminating means for directing a beam of light on said light responsive device, light transmitting means positioned to intercept a beam from said illuminating means, said light transmitting means varying in light transmitting qualities in the direction of movement of said light transmitting means to provide a continuous range of intensities from full bright to blackout.

13. Electrical control apparatus as set forth in claim 12 wherein said light transmitting means may be transparent or translucent, a member gradually varying in light transmitting qualities in direction of movement of said light transmitting means.

14. Electrical apparatus for controlling the current supplied to a load comprising a pair of silicon controlled rectifiers connected in back to back relation to pass alternating halves of an alternating current, an air core choke in series with said silicon controlled rectifiers to pass the current passed through said silicon controlled rectifiers and having a short time constant to normal rated current values of said silicon controlled rectifiers and a long time constant to the maximum permissible currents of said silicon controlled rectifiers and limiting the rate of rise of currents passed by said silicon controlled rectifiers, a magnetic amplifier having two anode windings with two anode uncontrolled rectifiers connected in series with said anode windings respectively and connected across the gate and cathode electrodes for firing a respective silicon controlled rectifier and normally biasing said amplifier in a full bright firing condition, two bridge uncontrolled rectifiers connected in back to back relation across the current supply forming an intermediate portion between said bridge uncontrolled rectifiers and two resistors connected in series and in parallel with said bridge uncontrolled rectifiers, a bias winding and a resistor connected in series between said intermediate portions of said bridge uncontrolled rectifiers and said resistors, a control winding and a photoresistor connected in series and in parallel with said bias winding and said bias winding resistor for opposing the flux of said bias winding and the phase relation of the pulse in said anode windings and the load current, and a retarder winding and photoresistor in series connected in parallel with said bias winding and said control winding circuits, an impedance in series with said silicon controlled rectifiers and a lamp connected in parallel thereto for receiving a current on the occurrence of surge conditions to retard the pulse in said anode windings to limit the surge current to below permissible values in cooperation with the air choke to discontinue the excessive current.

15. Electrical control apparatus for controlling the current applied from an alternating current source to a load comprising electrical current solid state controlled device means having anode, cathode and gate electrodes, trigger means connected to said cathode and gate electrodes for applying signals to render said solid state controlled device means conductive, an air core choke connected in series with said anode and cathode electrodes of said means and having a constant impedance limiting the maximum values of a surge current to less than the permissible values passed by said means, a circuit disruptive means connected in series with said anode and cathode electrodes of said first means and said air core choke to open said circuit on passage of said permissible currents over a given period of time to prevent destruction of the silicon controlled rectifier.

16. Electrical control apparatus for controlling the current applied from an alternating current source to a load comprising solid state thryatron type means having anode, cathode and gate electrodes, trigger means connected to said cathode and gate electrodes for applying signals to render said solid state thyratron type means conductive, an air core choke having a constant impedance and connected in series with said anode and cathode electrodes of said means and limiting the maximum values of a surge current to less than the destructive values passed by said means, means for preventing the passage of current connected in series with said anode and cathode electrodes of said first means and said air core choke to receive energy from said surge currents over a given period of time to prevent further passage of current through the solid state thyratron type means.

17. Electrical control apparatus for controlling the current applied from an alternating current source to an incandescent lamp load comprising silicon controlled rectifier means having anode, cathode and gate electrodes for controlling the load current supplied to an incandescent load, trigger means connected to said cathode and gate electrodes for applying signals to render said silicon controlled rectifier means conductive, an air core choke connected in series with said anode and cathode electrodes of said controlled rectifier means and conducting the load current passing through said silicon controlled rectifiers, said air core choke having a short time constant to normal rated current values and a long time constant to overload currents to limit surge currents through said silicon controlled rectifier means to less than the permissible maximum sustained and permit sustained currents in excess of rated values for operating circuit protective devices.

18. Electrical apparatus for controlling the amount of load current comprising load current carrying means for receiving an alternating voltage and including a solid state controlled device passing half cycles of load current of the same polarity on being rendered conductive by a gate voltage synchronized with the proper polarity of the applied voltage and remaining conductive until removal of the applied voltage, a triggering means comprising two uncontrolled rectifiers connected in back to back relation and two series connected current limiting resistors connected in a bridge circuit therewith, a unijunction transistor having an emitter and two base electrodes, a gate impedance and said two base electrodes connected in series across the direct current diagonal between the resistors and the uncontrolled rectifiers for impressing a voltage across the base electrodes and the gate impedance, a condenser connected across the direct current diagonal and across said gate impedance and emitter to receive a charge of voltage for firing said transistor in timed relation to the alternating voltage and passing a discharge current through said transistor and said gate impedance for creating gating pulses, means coupling said gate impedance to said solid state controlled device for applying gate pulses to the solid state controlled device, circuit means of variable resistance connected across said condenser to delay the firing of the gating pulses on a decrease in resistance and reduce the current passed by the solid state controlled device.

19. Electrical apparatus for controlling the amount of load current as set forth in claim 18 wherein said circuit means comprises a photoresistor and a lamp connected across a load to impress voltage variations on said lamp for varying the illumination of the lamp directed on said photoresistor to decrease the resistance thereof and delay the gating pulses to compensate for the increase in voltage.

20. Electrical apparatus for controlling the amount of load current as set forth in claim 19 wherein there is provided a second impedance in series with the solid state device and a second lamp connected across said second impedance to vary in illumination in response to load current decreasing the resistance of said photoresistor to delay the firing of the solid state controlled device.

21. Electrical apparatus for controlling the amount of load current as set forth in claim 20 wherein there is provided a second photoresistor in series with said condenser to vary the rate of charge of said condenser delaying the formation of the gating pulses on an increase in resistance and advancing the formation of gating pulses on a decrease in resistance.

22. Electrical apparatus for controlling the amount of load current comprising load current carrying means for receiving an alternating voltage and including a solid state controlled device passing half cycles of load current of the same polarity on being rendered conductive by a gate voltage synchronized with the half cycle of applied voltage of the proper polarity, a triggering circuit connected across said device to receive the alternating voltage and comprising an uncontrolled rectifier, changeable impedance means for presenting a high impedance and being rendered conductive at a low impedance by a given voltage applied thereto and a second impedance connected in series to form a voltage network for placing a voltage on said changeable impedance means, means for coupling said second impedance to said solid state controlled device to apply a signal rendering said device conductive, a condenser connected to said changeable impedance means and across said second impedance to form a current path therewith, a resistor connected in series with said condenser and said uncontrolled rectifier to provide a current charging path through said condenser charging said condenser to the given voltage for rendering said changeable impedance conductive at the low resistance discharging the condenser through said second impedance creating a gate voltage for rendering said solid state controlled device conductive.

22. Electrical apparatus for controlling the amount of load current comprising load current carrying means for receiving an alternating voltage and iniluding a solid state controlled device passing half cycles of load current of the same polarity on being rendered conductive by a gate voltage synchronized with the proper polarity of the applied voltage and remaining conductive until removal of the applied voltage, phase shifting circuit coupled to said solid state controlled device for applying a gate voltage variable in phase to the applied half cycle to render said solid state controlled device conductive over at least a portion of the half cycle for varying the amount of load current, said phase shifting means including a condenser having a current charging path and a current discharging path to vary the phase relation of said gate voltage, a photoresistor connected in said charging path to vary the resistance in response to illumination to change the phase relation of the gate voltage, and a second photoresistor connected across said condenser to vary the rate of charge and the phase relation of the gate voltage in an opposite manner to said first photoresistor to provide a compound control of the solid state controlled device.

24. Electrical control apparatus for controlling the amount of load current comprising alternating load current carrying means receiving half cycles of the same polarity and including a solid state control device sensitive to destruction by peak currents exceeding permissible values for prescribed periods and passing a load current on being rendered conductive by a gate voltage synchronized with the proper polarity of the applied voltage and remaining conductive until removal of the applied voltage of the proper polarity, phase shifting means connected to said solid state device to apply a voltage variable in phase to the applied alternate half cycle to render said solid state controlled device conductive over at least a portion of the half cycle for varying the amount of load current passed by said device, a constant impedance inductive means connected in series with said device having a short time constant to normal rated current to permit the passage of the load current without limiting the peak value and a long time constant at surge currents to limit the peak current to permissible values, and a phase retarder having a current sensing member coupled to the load current carrying means and connected to said phase shifting means to delay the gating voltage for restricting the load current below permissible values after the first half cycle in cooperation with said constant impedance inductive means for discontinuing the passage of current in excess of rated values.

25. Electrical control apparatus comprising a multiplicity of control units for controlling load current to a given load, means for shifting the control from one control unit to another and having a light source for a respective control unit, each of said control units having a silicon controlled rectifier for controlling the load current and having a trigger circuit with a condenser forming timed pulses for firing said silicon controlled rectifier and with a light sensitive means coupled to said condenser and positioned to receive light from a respective light source to vary the timing of the pulses of a respective control unit without interference from other control units on energization of said shifting means.

References Cited by the Examiner

UNITED STATES PATENTS

| | | | |
|---|---|---|---|
| 500,726 | 7/1893 | Van Nuis | 317—66 |
| 558,750 | 4/1896 | Wright | 317—99 |
| 1,190,120 | 7/1916 | Creighton | 317—61.5 |
| 1,217,453 | 2/1917 | Jackson | 317—61.5 |
| 1,324,358 | 12/1919 | Larson | 317—99 |
| 2,315,320 | 3/1943 | Earle | 317—66 |
| 2,709,239 | 5/1955 | Briggs | 323—119 |
| 2,731,595 | 1/1956 | Gamertsfelder | 323—119 |
| 2,882,450 | 4/1959 | McCabe | 315—158 |
| 2,884,540 | 4/1959 | Schockley | 250—200 |
| 2,920,240 | 1/1960 | Macklem | 315—200 |
| 2,981,884 | 4/1961 | Tighe | 323—22 |
| 2,986,644 | 5/1961 | Cheroff | 250—225 |
| 2,994,029 | 7/1961 | Bixby | 323—22 |
| 2,998,547 | 8/1961 | Berman | 315—200 |
| 3,142,781 | 7/1964 | Izenour | 315—194 |

OTHER REFERENCES

Applications and Circuit Design Notes (A Survey of Some Circuit Application of Silicon Controlled Rectifier) Solid State Products, Inc., Bulletin D420–02, August 1959 see page 12.

HERMAN KARL SAALBACH, *Primary Examiner.*

ARTHUR GAUSS, GEORGE N. WESTBY,
*Examiners.*

S. CHATMON, *Assistant Examiner.*